Sept. 12, 1944.    A. PALONCY    2,357,967
OIL SEALING RING ASSEMBLY
Filed July 7, 1943
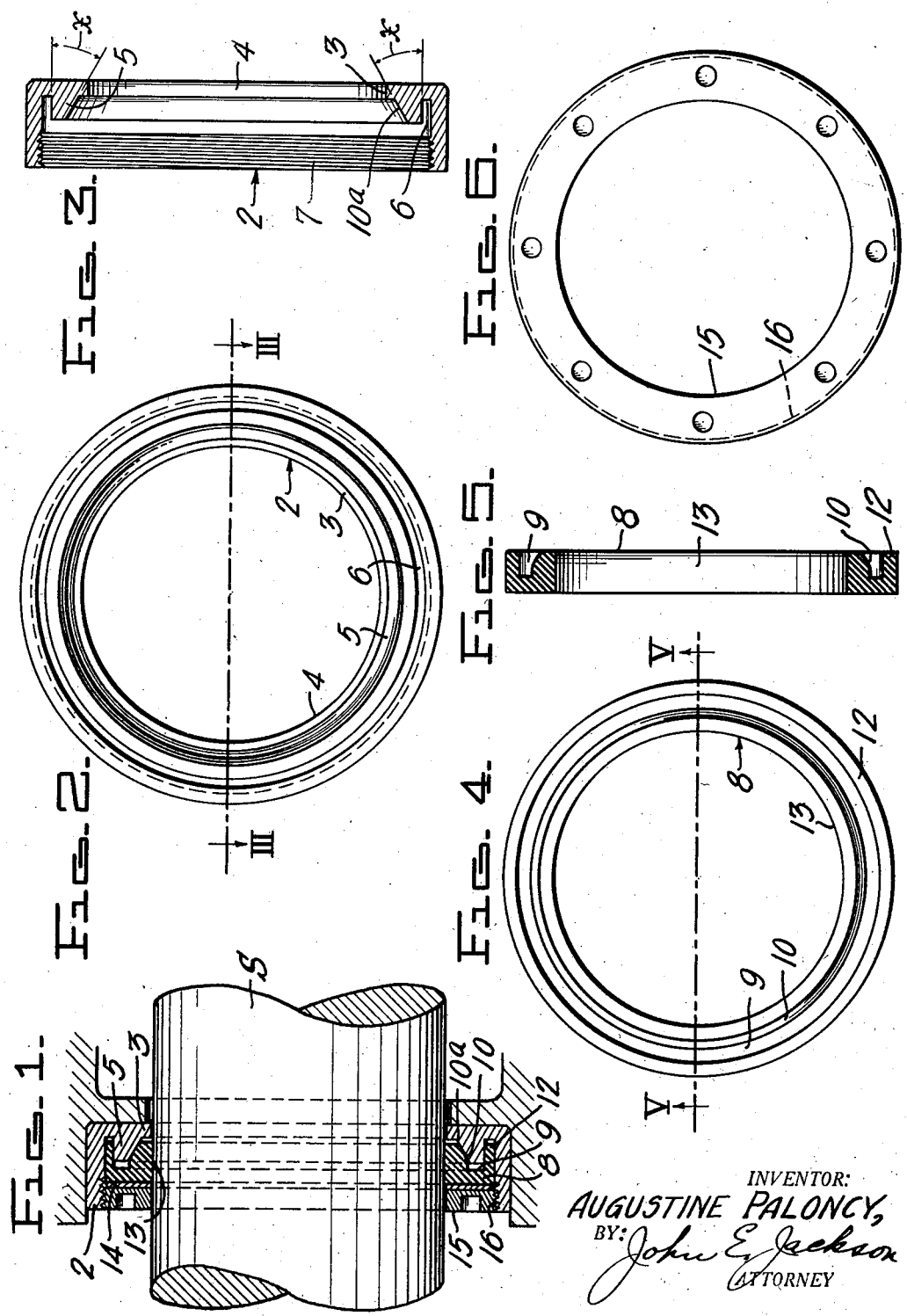
INVENTOR:
AUGUSTINE PALONCY,
BY: John E. Jackson
ATTORNEY Patented Sept. 12, 1944

2,357,967

UNITED STATES PATENT OFFICE 2,357,967

OIL SEALING RING ASSEMBLY

Augustine Paloncy, Gary, Ind.

Application July 7, 1943, Serial No. 493,776

2 Claims. (Cl. 288—3)

This invention relates to oil sealing rings, and, particularly, to an improved oil or lubricant sealing ring assembly for rotatable shafts and the like.

Various types of oil sealing rings or means have been suggested and used for preventing the escape of oil or other lubricant from around the shafts and gear housings, the necks of the rolls of rolling mills and the rotatable member or shaft of other pieces of apparatus where it is desired to lubricate the bearings thereof or other moving parts without the loss of the lubricating medium. While some of these sealing rings were satisfactory, others were very unsatisfactory in that, after a short period of use the sealing gasket or member would wear and the lubricant would escape from around the shaft or rotatable member thereby defeating the purpose of the sealing ring. There was no provision in their design for wear or adjustment, and consequently, this necessitated a rather frequent replacement of the sealing ring which was not only inconvenient and expensive but interfered with production and the use of the particular apparatus.

Accordingly, it is the general object of the present invention to provide an improved oil or lubricant sealing ring assembly which can be quickly and conveniently adjusted in order to compensate for any wear to which it is subjected while in use.

It is another object of the invention to provide an improved oil or lubricant sealing ring assembly which can be easily incorporated with existing equipment and, one that consists of a minimum number of parts.

It is a further object of this invention to provide an improved oil or lubricant sealing ring assembly which is simple and inexpensive in its construction, and, at the same time, efficient and effective in its use.

Various other objects and advantages of this invention will be more apparent in the course of the following specification and will be particularly pointed out in the appended claims.

In the accompanying drawing there is shown, for the purpose of illustration, an embodiment which my invention may assume in practice.

In the drawing:

Figure 1 is a vertical sectional view of the improved oil or lubricant sealing ring assembly of my invention showing how it is assembled in the side of the housing or frame of a rolling mill or other apparatus with which it is to be used;

Figure 2 is a plan view of the outer side of the cylindrical housing member of my improved oil or lubricant sealing ring assembly;

Figure 3 is a sectional view taken on line III—III of Figure 2;

Figure 4 is a plan view of the inner side of the yieldable sealing gasket or member of my improved assembly;

Figure 5 is a sectional view taken on line V—V of Figure 4; and

Figure 6 is a plan view of the outer side of the adjusting ring or nut of my improved oil or lubricant sealing ring assembly.

Referring more particularly to the drawing, the improved oil or lubricant sealing ring assembly of my invention comprises, as shown in detail in Figures 2 and 3, a cylindrical housing member 2 having an inwardly radially extending flange portion 3 arranged on one end thereof having an opening 4 arranged axially therethrough of a diameter slightly larger than that of the shaft or rotatable member with which the assembly is to be used. On the inner side of the flange 3, there is disposed preferably a circular wedge-shaped portion 5 which is arranged concentric with the axis of the housing 2 and the opening 4 therethrough. The outer periphery of the circular wedge-shaped portion 5 is substantially flat and is spaced from the inner periphery of the cylindrical housing member 2 so as to provide an annular groove or recess 6 therebetween. The inner periphery or wall 10$^a$ of the circular wedge-shaped portion 5 is tapered inwardly preferably at an angle, designated at X, of from approximately 25 to 40 degrees with the axis of the housing member 2. At the end opposite that from the flange portion 3 and the circular wedge-shaped portion 5 carried thereby, the cylindrical housing member 2 is interiorly threaded as at 7.

There is provided, as shown in detail in Figures 4 and 5 of the drawing, an annular sealing gasket or member 8 which is made from yieldable material, preferably neoprene having a durometer gage hardness of from 40 to 50. On one side of the yieldable member 8, there is arranged an annular wedge-shaped groove 9 which is shaped similar to the circular wedge-shaped portion 5 of the flange 3, but slightly smaller in cross-section, and which cooperates therewith for a purpose and in a manner hereinafter to be described. The inner wall of the annular recess 9 is preferably arcuated as at 10 with the radius of arcuation being approximately from 25 to 35 per cent of the depth of this wall. It will be seen that the annular recess 9 so arranged or formed in the yieldable member 8 provides a lip portion 12 around the outer periphery of the yieldable member 8 on the same side thereof as the recess 9. The axial opening 13 through the annular yieldable member 8 is substantially equal to or slightly greater than the shaft or rotatable member with which the sealing ring assembly is adapted to be used.

There is also provided, an annular guide or follower plate 14 which is adapted to cooperate with the yieldable member 8 in a manner to be described. Also there is provided, as shown in detail in Figure 6, an annular nut-like pressure member 15 which is exteriorly threaded as at 16 which threaded portion is adapted to cooperate with the interiorly threaded portion 7 of the housing 2 in a manner to be described. The diameter of the axial opening through both the follower plate 14 and the nut-like member 15 is slightly larger than the diameter of the shaft with which the assembly is to be used.

The above described parts are assembled in the following manner to provide my improved oil or lubricant ring assembly, as shown in Figure 1. The annular yieldable member 8 is first assembled in the cylindrical housing 2 so that the circular wedge-shaped portion 5 of the flange 3 fits into the annular wedge-shaped recess 9 of the yieldable member. In such position, it will be seen that lip portion 12 of the yieldable member will be positioned in the annular recess 6 arranged around the circular wedge-shaped portion 5 and that the inclined surface 10ᵃ of the wedge-shaped portion will abut against the arcuate portion 10 of the annular yieldable member 8, and that the outer side of the circular wedge-shaped portion 5 is spaced from the bottom of the annular recess 9 in the yieldable member 8 so as to permit further movement relative to each other for the purpose of adjustment. The guide or follower plate 14 is then positioned within the housing 2 against the outer side of the yieldable member 8, and the nut-like member 15 is then screwed into the threaded portion 7 at the outer end of the housing 2. It will be seen that the individual parts are now in position so as to provide a complete oil sealing ring assembly.

The oil or lubricant sealing ring assembly is then positioned around the shaft S and in the housing or frame of the particular piece of apparatus with which it is to be used so that the outer periphery of the housing 2 of the assembly fits tightly into a hole in the side of the housing or frame, as shown in Figure 1 of the drawings. After the assembly has been positioned in the housing or frame around the shaft or rotatable member, the nut-like member 15 is then tightened, preferably by means of a suitable tool inserted in the holes arranged in the outer side thereof thereby forcing the follower plate 14 inwardly against the outer side of the yieldable member 8, which, in turn, forces the yieldable member 8 inwardly toward the flange 3. Upon such movement, it will be seen that the circular wedge-shaped portion 5, due to the wedging action provided by the cooperation of the inclined inner surface 10ᵃ thereof and the arcuated inner wall 10 of the yieldable member 8, tends to force the inner periphery of the yieldable member 8 radially inwardly toward the shaft S and in contact therewith so as to provide a point contact between the outer periphery of the shaft and the inner periphery of the yieldable member 8 and to distort the yieldable member 8 into the recess 9. After the nut-like member 15 has been drawn up sufficiently to seal properly the space around the shaft so as to prevent the oil or other lubricant from escaping therearound, the machine or piece of apparatus with which my improved oil ring assembly is incorporated is ready for use, and it will be seen that the oil sealing ring assembly of the present invention effectively seals the space around the shaft or rotatable member during the rotation thereof. Due to the distortion of the yieldable member 8 into the recess 9, the assembly is, in effect, self-adjusting for a considerable length of time since such distortion compensates for wear on the inner surface of the yieldable member 8.

After the oil ring assembly has been in service for a time and if it is found that the annular yieldable member or gasket 8 is worn, it will be understood that the nut-like member 15 is tightened so as to again force the follower plate 14 against the outer side of the yieldable member 8. Again upon further movement of the plate 14 into the housing 2, it will be seen that the yieldable member 8 is forced toward the flange 3 and upon such movement, the circular wedge-shaped portion 5 will move further into the recess 9 and again force the inner periphery of the annular yieldable member 8 against the outer periphery of the shaft S or rotatable member so as to prevent any escapement of the oil or lubricant from therearound. It will be understood that an adjustment is made in a similar manner thereafter at any time when the oil or lubricant again appears to be escaping from around the shaft or rotatable member.

As a result of my invention, it will be seen that there is provided an improved oil or lubricant sealing ring assembly which can be easily and quickly adjusted so as to prevent leakage of the oil or lubricant from around the shaft or rotatable member with which it is incorporated. It will be understood that the yieldable member or sealing gasket 8, due to the construction and arrangement thereof, need not be replaced until the circular wedge-shaped portion 5 contacts the bottom of the annular recess 9 arranged in the yieldable member 8. In such an event, it will be seen that the annular yieldable member 8 cannot move inwardly any further toward the flange 3, and, of course, it is then necessary under such conditions to replace the same. It will be seen that this is the only part of my improved oil ring assembly that is subject to wear and that needs to be replaced periodically.

While I have shown and described a specific embodiment of my invention, it will be understood that this embodiment is merely for the purpose of illustration and descripton and that various other forms may be devised within the scope of my invention, as defined in the appended claims.

I claim:

1. A unitary sealing ring assembly of the class described for use with rotatable shafts and the like comprising a housing member, an inwardly radially extending flange portion arranged on one end of said housing member having an axial opening therethrough of a diameter slightly larger than that of the shaft on which the assembly is to be used, a longitudinally extending integral flange portion on said inwardly extending flange portion, one side of said longitudinally extending flange portion being angularly disposed with respect to the longitudinal axis thereof to provide a wedge-shaped opening therein, the other side of said flange extending substantially parallel to the longitudinal axis of said housing member to form an annular longitudinally extending recess therein, an annular member made of yieldable material arranged within said housing, said annular member having a wedge-shaped recess in the forward side thereof, one side thereof being adapted to engage the inclined surface of said inwardly extending flange portion, the other side of said recess being substantially parallel to the outer side of the annular member whereby there is formed an annular longitudinally extending lip thereon having a slightly greater cross-sectional thickness than the annular recess in said housing member and adapted to be disposed therein, and means for forcing the forward side of said annular yieldable member onto said wedge-shaped flange whereby the inner surface thereof is forced inwardly into engagement with a shaft contained therein and the annular lip thereon is forced into the annular recess in said housing member to hold said yieldable member concentric within said housing and to form a secondary seal to prevent leakage along the outer side of said yieldable member.

2. A unitary sealing ring assembly of the class described for use with rotatable shafts and the like comprising a housing member, an inwardly radially extending flange portion arranged on one end of said housing member having an axial opening therethrough of a diameter slightly larger than that of the shaft on which the assembly is to be used, a longitudinally extending integral flange portion on said inwardly extending flange portion, one side of said longitudinally extending flange portion being angularly disposed with respect to the longitudinal axis thereof to provide a wedge-shaped opening therein, the other side of said flange extending substantially parallel to the longitudinal axis of said housing member to form an annular longitudinally extending recess therein, an annular member made of yieldable material arranged within said housing, said annular member having a wedge-shaped recess in the forward side thereof, said recess being deeper than the length of the inwardly extending flange portion, one side being adapted to engage the inclined surface of said inwardly extending flange portion, the other side of said recess being substantially parallel to the outer side of the annular member whereby there is formed an annular longitudinally extending lip thereon having a slightly greater cross-sectional thickness than the annular recess in said housing member and adapted to be disposed therein, and means for forcing the forward side of said annular yieldable member onto said wedge-shaped flange whereby the inner surface thereof is forced inwardly into engagement with a shaft contained therein and the annular lip thereon is forced into the annular recess in said housing member to hold said yieldable member concentric within said housing and form a secondary seal to prevent leakage along the outer side of said yieldable member, and to distort the yieldable member into the opening between the bottom of the recess and the end of the longitudinally extending flange portion to maintain the desired sealing pressure on the surfaces of said yieldable member.

AUGUSTINE PALONCY.